Aug. 11, 1925.                                                   1,549,405
G. S. BJURSTROM
AUTOMATIC FISHING DEVICE
Filed April 2, 1924

INVENTOR:
GUSTAV S. BJURSTROM
BY
George W. Saywell
ATTORNEY.

Patented Aug. 11, 1925.

1,549,405

UNITED STATES PATENT OFFICE.

GUSTAV S. BJURSTROM, OF CLEVELAND, OHIO.

AUTOMATIC FISHING DEVICE.

Application filed April 2, 1924. Serial No. 703,604.

*To all whom it may concern:*

Be it known that I, GUSTAV S. BJURSTROM, a citizen of the United States, resident of Cleveland, county of Cuyahoga, and State of Ohio, have invented new and useful Improvements in Automatic Fishing Devices, of which the following is a specification, the principle of the invention being herein explained and the best mode in which I have contemplated applying that principle, so as to distinguish it from other inventions.

My invention relates to apparatus for catching fish and particularly to a special structure of this nature adapted automatically to hook fish when they nibble at the usual hook.

The annexed drawing and the following description set forth in detail certain means embodying my invention, such means constituting, however, but one of the various forms in which the principle of the invention may be applied.

Figure 2:
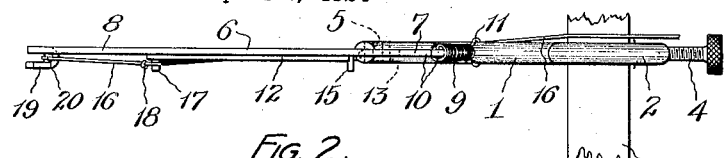
Figure 2 represents a plan view of the device as shown in Figure 1.
Figure 1:
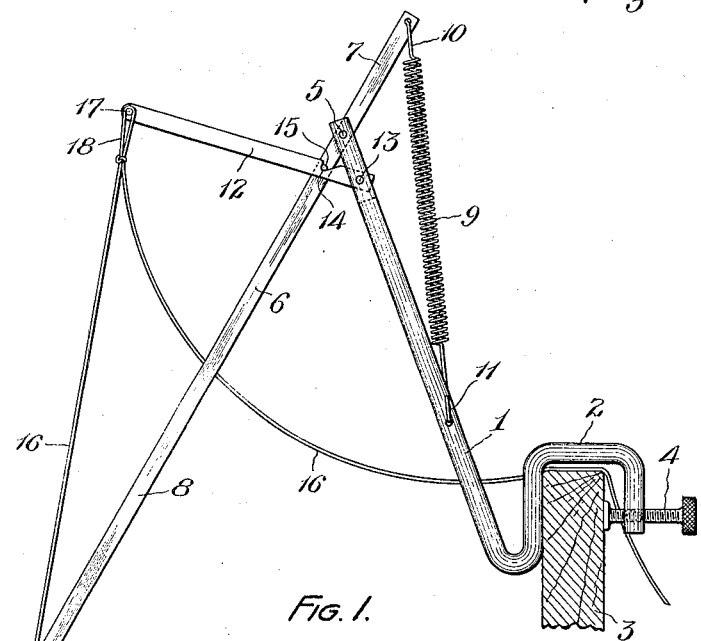
Figure 1 represents a side elevation of my improved device in its cocked position.
Figure 3:
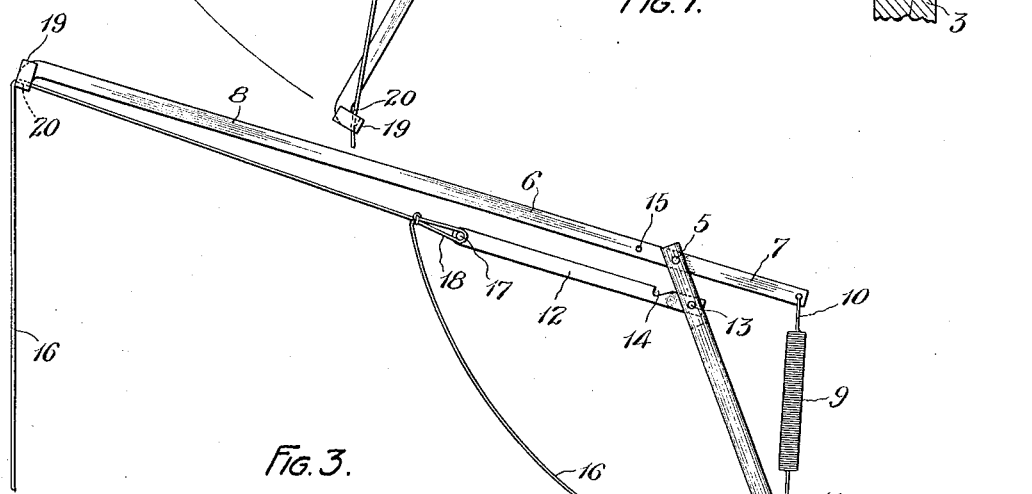
Figure 3 represents a view similar to Figure 1, but showing the several parts of the device in released positions.

Referring to the annexed drawing in which the several parts are indicated in the various figures by the same respective ordinals, I indicate a support by the ordinal 1, the same being adapted to be secured at one end upon the bank of the lake or stream, or, as shown in the accompanying drawing, being adapted to be fastened to a boat 3. For this purpose the support 1 is formed with a U-shaped clamp 2 adapted rigidly to be secured to the boat 3 by means of a threaded clamping screw 4. The support 1 is an upwardly extending member, as plainly shown in the accompanying drawing, and adjacent the upper end of this support 1 is pivotally secured a rod 6. This rod 6 is secured to the support 1 intermediate its ends but much nearer one end than the other so that said rod 6 normally is suspended in a depending position with the longer end 8 hanging downwardly and the shorter end 7 extending upwardly from the pivot pin 5, as plainly shown. A spring 9 is secured adjacent one end 10 to the upper end of the rod part 7 and at its other end 11 to the upwardly extending support 1. Thus, the spring 9 normally holds the rod 6 in the position shown in Figure 3. Pivotally secured at one end to the support 1 by means of a pin 13 is a trip arm 12 formed upon its upper edge with a notch 14 adapted detachably to receive a pin 15 secured to the rod 6. It is evident then that when the pin 15 is engaged with the notch 14, the rod 6 will be held in the position shown in Figure 1 against the tension of the spring 9. The fishing line is indicated by the ordinal 16 and the same is secured at one end upon the bank or in the boat 3 in any desired manner (not shown), the other end having secured thereto the usual hook suspended in the water at any desired height. Intermediate its ends the line 16 is secured to the outer free end of the trip arm 12 and to the lower end of the rod 6, so that a pull upon the hook or even a nibble at the hook will cause the line 16 both to pull downwardly upon the arm 12 and to tend to raise the rod 6 in a more nearly vertical position. For the purposes of illustrating the connection of the line 16 with the arm 12 and rod 6, I have shown a pin 17 secured to the arm 12 and the line 16 formed with a loop 18 which is fastened over the pin 17. I have also shown the lower end of the rod 6 formed with a U-shaped loop 19 through which the section 20 of the line 16 passes so that a pull upon the line is exerted upon the loop 19 and tends to straighten up the rod 6. The purpose of thus attaching the line 16 to the trip arm 12, as well as the rod 6, is to insure the disengagement of the notch 14 and the pin 15. Not only is this disengagement thus insured but it forms a very sensitive trigger so that the slightest nibble upon the hook will cause the pin 15 to be released from the notch 14 thus insuring the action of the spring 9 to jerk the rod 6 into the position shown in Figure 3, whereby the hook is jerked quickly and vigorously into the mouth of the fish.

What I claim is:

1. In an automatic fishing device, the combination of a stationary support; a spring-controlled rod pivotally secured intermediate its ends to said support; a spring secured to the end portion of the rod at one end and at its other end to said support; a trip pivotally secured to said support and adapted to hold said rod in one position against the tension of the spring; and line-holding means formed on said rod and trip, whereby a pull upon the line positively moves both said rod and said trip to disengage the same and allow the spring to function.

2. In an automatic fishing device, the combination of a stationary support; a rod pivotally secured intermediate its ends to said support; a trip pivotally secured to said support at one end and formed adjacent its other end with line-holding means; a spring secured at one end to one end portion of said rod and at its other end to said support, said rod being formed with detachable trip-engaging means; and line-holding means formed adjacent the other end of said rod.

3. In an automatic fishing device, the combination of a stationary support; a rod pivotally secured intermediate its ends to said support; a trip-arm pivotally secured to said support at one end and formed adjacent its other end with line-holding means; a spring secured at one end to one end portion of said rod and at its other end intermediate the ends of said support, said trip-arm being formed with a notched portion, and said rod being formed with a member detachably engaging said notched portion of said arm; and line-holding means formed adjacent the other end of said rod.

4. In an automatic fishing device, the combination of a support formed with a boat-clamping member and an upwardly-extending arm; a rod pivotally secured intermediate its ends adjacent the upper end of said arm; a trip-arm pivotally secured to said support at one end and formed adjacent its other end with line-holding means, said trip-arm being formed with a notched portion, and said rod being formed with a pin detachably engaging said notched portion of said arm, said rod being normally suspended in a depending position; a spring secured at one end adjacent the upper end of said rod and at its other end to the upwardly-extending arm of said support; and line-holding means formed adjacent the lower end of said rod.

Signed by me this 18th day of March, 1924.

GUSTAV S. BJURSTROM.